United States Patent [19]
Narita

[11] Patent Number: 5,797,977
[45] Date of Patent: Aug. 25, 1998

[54] METHOD OF PLATINUM RECOVERY

[75] Inventor: Katutoshi Narita, Ibaraki-ken, Japan

[73] Assignee: Nippon Mining & Metals Co., Ltd., Ibaraki, Japan

[21] Appl. No.: 803,109

[22] Filed: Feb. 20, 1997

[30] Foreign Application Priority Data

May 27, 1996 [JP] Japan ..................... 8-131929

[51] Int. Cl.[6] ................................. C22B 11/00
[52] U.S. Cl. ............................. 75/426; 75/633
[58] Field of Search ........................ 75/426, 633

[56] References Cited

U.S. PATENT DOCUMENTS 4,390,366  6/1983  Lea et al. ..................... 75/426

Primary Examiner—Melvyn Andrews
Attorney, Agent, or Firm—Pennie & Edmonds LLP

[57] ABSTRACT

A neutralizing reagent is added to a solution of chloroplatinic acid containing impurities to adjust the pH value of the solution to 5.5–7.0, the insoluble impurity compounds that precipitated in this first neutralization step is filtrated off, a neutralizing reagent is added to the first filtrate of chloroplatinic acid to adjust the pH value of the solution to 9.5–10.5, the insoluble impurity compounds that precipitated out in the second neutralization step is filtrated off, hydrochloric acid is then added to the second filtrate in which the insoluble impurity compounds have been removed, and ammonium chloride is added to the processed solution to convert platinum compound to ammonium chloroplatinate, which is intensely heated to yield platinum sponge. The preferred neutralizing reagent is NaOH or KOH. Filtration is preferably performed with a filter of which opening size is equal or less than 0.3 μm.

2 Claims, 1 Drawing Sheet

METHOD OF PLATINUM RECOVERY

BACKGROUND OF THE INVENTION

This invention relates to a method of platinum recovery. More particularly, the invention relates to a method that is suitable for recovering platinum as a valuable metal from the anode slime that is produced during processing sulfide ores, and other residues, as well as sludge and dust that contain platinum in.

DESCRIPTION OF THE RELATED ART

In the refining of sulfide ores by a pyro-metallugical process, platinum present in very small amounts in ores is concentrated together with other valuable metals such as gold and palladium in the anode slime which is produced during the electrorefining of silver and nickel. When the anode slime is treated with nitric acid ($HNO_3$), Most of the platinum and palladium in the slime dissolve into the nitoric acid solution. The greater part of the silver is removed as $AgNO_3$ and the rest of the silver is precipitated as AgCl by adding hydrochloric acid (HCl). Palladium, on the other hand, is separated by extraction with a suitable organic reagent such as dialkyl sulfide and, subsequently, platinum is extracted with a suitable organic reagent such as tributyl phosphate (TBP). The platinum loaded organic reagent is then scrubbed with a suitable solution such as hydrochloric acid (ca. 1–5M) and stripped with HCl of ca. 0.2M (preferably followed by evaporation to concentrate the strip solution to about one sixth of the initial volume). Platinum is then oxidized with chlorine gas to form chloroplatinic (IV) acid ($H_2PtCl_6$) and, thereafter, ammonium chloride ($NH_4Cl$) (preferably a saturated solution of ammonium chloride in more than a stoichiometric amount at ca. 80° C.), whereby platinum is precipitated as ammonium chloroplatinate (($NH_4)_2[PtCl_6]$) and the precipitate is cooled, separated, washed and heated intensely such that metallic platinum (sponge platinum) is finally recovered.

The solution of chloroplatinic acid contains not only platinum but also many other impurities such as palladium, silver, thin, copper and tellurium. Hence, several methods have been proposed as preliminary treatments of the solution of chloroplatinic acid that are performed before the conversion with ammonium chloride and two representative approaches are as follows:

(1) ammonium chloride is added to the solution of chloroplatinic acid, whereby platinum is precipitated as ammonium chloroplatinate, which is converted to sponge platinum by heating intensely. The sponge platinum in turn, is dissolved in aqua regia and reverted to the solution of chloroplatinic acid; this procedure is performed more than once (in other words, the step of refining platinum is repeated);

(2) an organic compound such as tributyl phosphate (TBP) is added to a solution of chloroplatinic acid such that platinum is selectively separated from the solution by the organic reagent and the platinum loaded reagent is scrubbed with a cleaning solution such as HCl (ca. 1–5M) and stripped with water or diluted hydrochloric acid (ca. 0.2M) to be reverted to the solution of chloroplatinic acid ($H_2PtCl_6$).

A problem with the first proposal is that it takes long time since it must need to repeat the procedure many times to refine the platinum compound. In the second approach which requires scrubbing in order to remove impurities, a part of platinum is also distributed into the cleaning solution and carried out of the system. This contributes to less efficient platinum recovery.

SUMMARY OF THE INVENTION

An object, therefore, of the invention is to provide a simple method by which platinum can be recovered in high purity and with high efficiency.

The present inventors made intensive studies in order to attain the stated object and found that when a solution of platinum chloride which was conventionally used as the starting material for platinum recovery was subjected to a two-stage neutralization step (pH value was adjusted to 5.5–7.0 in the first stage and 9.5–10.5 in the second stage) such that the impurities were removed as insoluble compounds, and high purity platinum could be obtained by subsequent conversion to ammonium chloroplatinate. The present invention has been accomplished on the basis of this finding.

DETAILED DESCRIPTION OF THE INVENTION

Figure 1:
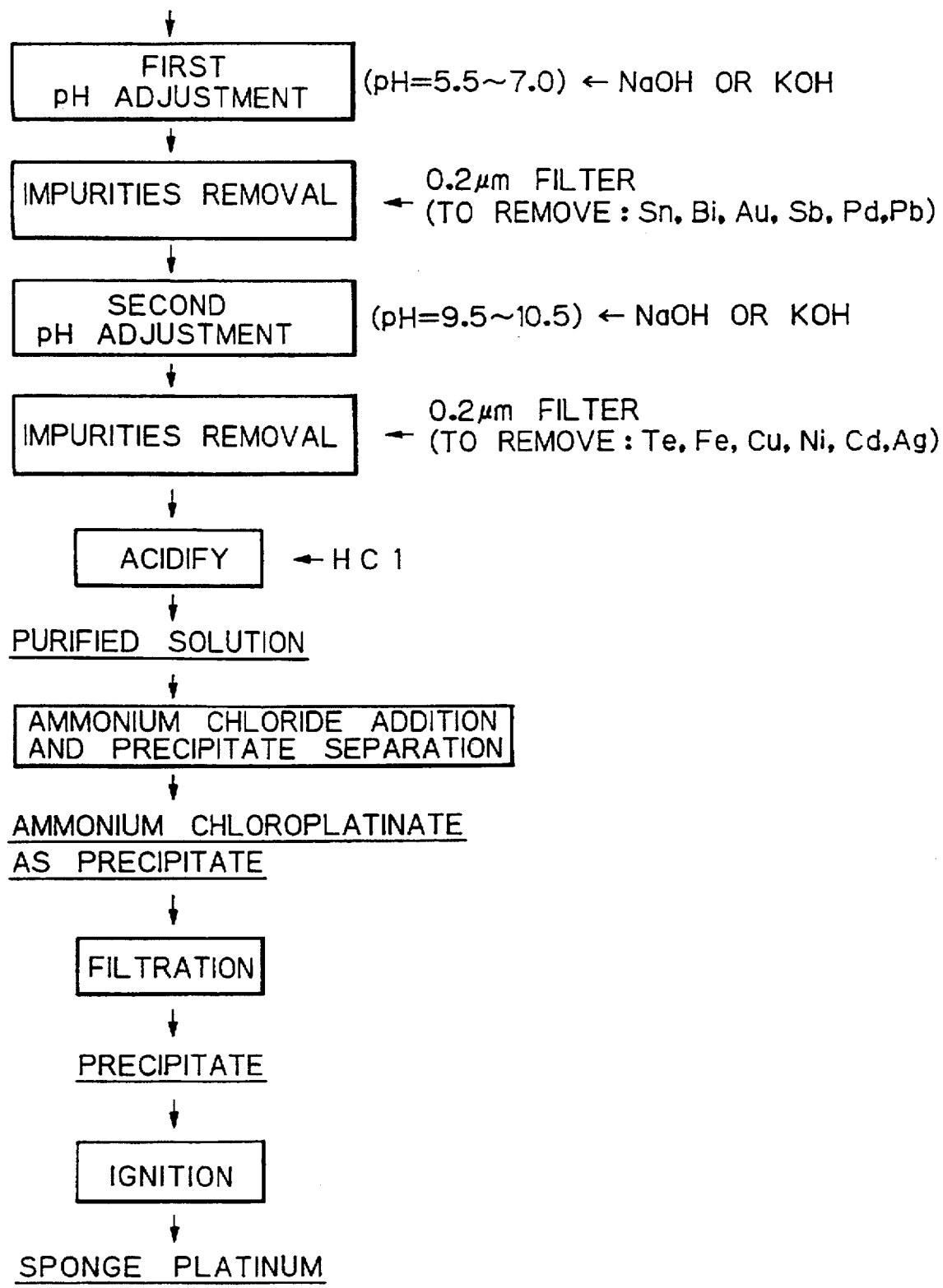
FIG. 1 is a flowsheet showing an embodiment of this invention.

The method of platinum recovery according to the invention comprises:

the first neutralization step in which a neutralizing reagent is added to a solution of chloroplatinic acid containing impurities to adjust the pH value of the solution to 5.5–7.0;

the step of filtrating off the insoluble compounds that is produced in the first neutralization step;

the second neutralization step in which a neutralizing reagent is added to the filtrate of chloroplatinic acid to adjust the pH value of the solution to 9.5–10.5;

the step of filtrating off the insoluble compounds that is produced in the second neutralization step;

the step of adding hydrochloric acid to the second filtrate;

the step of adding ammonium chloride to the acidified solution to converted platinum to ammonium chloroplatinate; and the step of intensely heating the salt to yield sponge platinum.

Preferably, the steps of filtrating off the insoluble compounds that has produced in the first and second neutralization steps are performed using a filter of which opening size is equal or less than 0.3 μM.

The present invention will become apparent by referring to the accompanying FIG. 1 which is a flowsheet showing an embodiment of the invention.

An embodiment of the invention process will now be described in detail with reference to the flowsheet in FIG. 1. As shown, the process comprises the following steps.

(1) The first neutralization step in which a neutralizing reagent is added to a solution of chloroplatinic acid to adjust the pH value of the solution to 5.5–7.0:

The solution of chloroplatinic acid has preferably a concentration of 1–30 g/L. The solution may originate from natural ores or it may be obtained by refining them. A typical example is a raffinate obtained by an extraction of palladium. The neutralizing reagent to be added is preferably sodium hydroxide or potassium hydroxide. Presumably, adjusting pH value to 5.5–7.0 reduces the solubility of tellurium to such a level that tellurium can be removed and also produces insoluble compounds of tin, bismuth, gold, antimony, pladium and lead.

(2) The step of removing the insoluble compounds produced in the first neutralization step:

This step is preferably implemented by filtration and it may be performed either batchwise or continuously. The step following the second neutralization step and in which the insoluble compounds that produced in the second neutralization step may be performed in the same way. Preferably, the steps of removing the insoluble compounds produced in the first and second steps are achieved using a filter of which opening size is equal or less than 0.3 μm.

(3) The second neutralization step in which a neutralizing reagent is added to the first filtrate of chloroplatinic acid to adjust the pH value of the solution to 9.5–10.5:

Again, the neutralizing reagent to be used in this step is preferably sodium hydroxide or potassium hydroxide. Presumably, adjusting the pH value to 9.5–10.5 causes precipitation of impurities, particularly tellurium, iron, copper, nickel, cadmium and silver.

The insoluble compounds are removed by filtration. The filtrate is basic and must be acidified by adding hydrochloric acid to make its concentration preferably 0.05–1N.

The solution that has been treated through the foregoing steps is subsequently processed in the same manner as in the prior art; namely, ammonium chloride (preferably an excess amount of a saturated solution of ammonium chloride at about 80° C.) is added to the solution, thereby precipitating ammonium chloroplatinate (which is cooled if a solution of ammonium chloride having a higher temperature than ordinary temperatures is employed) and the precipitate is filtrated (leaving Si and As in the filtrate), washed with ammonium chloride solution and water, dried, heated intensely (ignition) to convert to sponge platinum. The sponge platinum is ground into particle to be cast into a platinum ingot, after the particle is first washed with hydrochloric acid solution, then with water, and dried to sponge platinum.

The method of the invention may be combined with either of the conventional methods (1) and (2) such that it is practiced prior to the implementation of those methods. If the invention method is combined with the conventional method (1), the number of repetition of the refining steps can be reduced. If it is combined with the conventional method (2), a solution of chloroplatinic acid which has been obtained by stripping from an organic reagent without scrubbing stages can be subjected to the subsequent two-stage neutralization process. Thus, the step of scrubbing with an aqueous solution of HCl can be omitted.

Samples of starting solution (i.e., a solution of chloroplatinic acid containing impurities) were neutralized with an aqueous solution of sodium hydroxide under the conditions listed in Table 1 and, thereafter, HCl was added for pH adjustment. The starting solution and the respective treated solutions had the contents shown in Table 2. Among other things, Pd, Ag, Cu and Te were analyzed as impurities.

TABLE 1

| Treated Solution | Steps of Treatment |
|---|---|
| 1 | First neutralization at pH = 6 |
|   | Second neutralization at pH = 10 |
| 2 | First neutralization at pH = 6 |
|   | No second neutralization |
| 3 | First neutralization at pH = 7 |

TABLE 1-continued

| Treated Solution | Steps of Treatment |
|---|---|
|   | No second neutralization |
| 4 | Not neutralized but purified twice by dissolution in aqua regia. |
| 5* | Not neutralized but produced from a stripped solution |

*Treated solution 5 was obtained by scrubbing with HCl (1 M) and subsequent stripping with water.

Treated solution 1 was the only sample prepared according to the invention.

TABLE 2

| | Analysis of Impurities* | | | |
|---|---|---|---|---|
| | Pd | Ag | Cu | Te |
| Treated solution 1 | 12 | <5 | 28 | <5 |
| 2 | <5 | 7 | 27 | 770 |
| 3 | 14 | 21 | 140 | 32 |
| 4 | <5 | <5 | 8 | 670 |
| 5 | 22 | 5 | 43 | 3200 |
| Starting solution | — | 0.015 | 0.5 | 0.5 |

*The unit of measurement is ppm for the treated solutions and g/L for the starting solution.

The result shows that impurities could effectively be removed from the starting solution by performing neutralization in two stages. The thus treated solution of chloroplatinic acid is subjected to the next step of adding ammonium chloride and roasted to thereby yield sponge platinum of a higher purity than in the prior art.

Hence, the method of the invention is capable of efficient recovery of high-purity platinum.

What is claimed is:

1. A method of platinum recovery comprising:

the first neutralization step in which a neutralizing reagent is added to a solution of chloroplatinic acid containing impurities to adjust the pH value of the solution to 5.5–7.0;

the step of filtrating off the insoluble compounds that produced in the first neutralization step;

the second neutralization step in which a neutralizing reagent is added to the first filtrate of chloroplatinic acid to adjust the pH value of the solution to 9.5–10.5;

the step of filtrating off the insoluble compounds that produced in the second neutralization step;

the step of adding hydrochloric acid to the solution from which the insoluble compounds has been removed;

the step of adding ammonium chloride to the thus processed solution to convert platinum into ammonium chloroplatinate; and the step of intensely heating the ammonium chloroplatinate to yield sponge platinum.

2. A method according to claim 1, wherein the steps of the insoluble compounds that has been produced in the first and second neutralization steps are achieved using a filter of which opening size is equal or less than 0.3 μm.

* * * * *

UNITED STATES PATENT AND TRADEMARK OFFICE
CERTIFICATE OF CORRECTION

PATENT NO. : 5,797,977
DATED : August 25, 1998
INVENTOR(S) : Katutoshi NARITA

It is certified that error appears in the above-identified patent and that said Letters Patent is hereby corrected as shown below:

In column 1, line 17, "Most" should be changed to --most--.
In column 1, line 61, "long time" should be changed to --a long time--.
In column 1, line 62, "it must need to repeat the procedure" should be changed to --the procedure must be repeated--.
In column 2, lines 36-37, "that is produced" should be changed to --produced--.
In column 2, line 45, "that has produced" should be changed to --produced--.
In column 3, line 6, "that produced" should be changed to --produced--.
In column 4, lines 45-46 and 51-52, "that produced" should be changed to --produced--.
In column 4, line 54, "has been" should be changed to --have been--.
In column 4, line 61, "A method" should be changed to --The method--.
In column 4, line 61, "steps of" should be changed to --steps of filtrating off--.
In column 4, line 62, "that has been produced" should be changed to --produced--.
In column 4, line 63, "using" should be changed to --by using--.

Signed and Sealed this

Eighth Day of June, 1999

Attest:

Q. TODD DICKINSON

*Attesting Officer*    *Acting Commissioner of Patents and Trademarks*